United States Patent
Shimaya et al.

[11] Patent Number: 6,050,914
[45] Date of Patent: Apr. 18, 2000

[54] DEVICE FOR RELEASING THE TENSION IN A MECHANICAL TENSIONER FOR A CHAIN

[75] Inventors: Kazuhiko Shimaya, Saitama-ken; Tadasu Suzuki, Tokyo-to, both of Japan

[73] Assignee: Tsubakimoto Chain Co., Osaka, Japan

[21] Appl. No.: 09/025,334

[22] Filed: Feb. 18, 1998

[30] Foreign Application Priority Data

Feb. 20, 1997 [JP] Japan .................................. 36359/1997

[51] Int. Cl.[7] ................. F16H 7/08; F16H 7/22; F16H 7/12
[52] U.S. Cl. .................... 474/109; 474/111; 474/138
[58] Field of Search ...................... 474/101, 109, 474/111, 136, 138, 140

[56] References Cited

U.S. PATENT DOCUMENTS

| | | | |
|---|---|---|---|
| 4,963,121 | 10/1990 | Himura et al. | 474/110 |
| 5,000,724 | 3/1991 | Reid | 474/140 |
| 5,088,966 | 2/1992 | Suzuki et al. | 474/111 |
| 5,248,282 | 9/1993 | Suzuki | 474/110 |

*Primary Examiner*—Mary Ann Battista
*Assistant Examiner*—Matthew A. Kaness
*Attorney, Agent, or Firm*—Dann, Dorfman, Herrell and Skillman; Henry H. Skillman

[57] ABSTRACT

A chain tension relieving device which prevents excessive tension being applied to a tension run of a chain. A shoe (5C) engages a tension run (3B) of a chain (3) stretched between a driving sprocket (1) and a driven sprocket (2) from another side of the chain in a bowed portion of the chain (3). When the tension acting on the tension run (3B) is of a prescribed value or less, the shoe surface of the shoe (5C) is held to a given advanced position so as to bow the tension run of the chain (3) by a biasing force of mechanical tensioner (15D). When the tension exceeds the prescribed value, the tension side (3B) of the chain (3) is straightened against the biasing force of the mechanical tensioner and the shoe surface of the shoe (5C) retreats from the given advanced position.

8 Claims, 3 Drawing Sheets

DEVICE FOR RELEASING THE TENSION IN A MECHANICAL TENSIONER FOR A CHAIN

FIELD OF THE INVENTION

The present invention relates to a chain tension relieving device for relieving excessive tension caused by variation of rotation of a driving sprocket and acting on a tension run of a chain stretched between a driving sprocket and a driven sprocket in a chain device system.

BACKGROUND OF THE INVENTION

In the prior art, a chain drive system for driving auxiliary machinery used to transmit rotation of a crankshaft of an engine to a cam shaft or the like has a construction such as shown in FIGS. 3 to 6.

The system shown in FIG. 3 has the simplest structure where a chain 23 is stretched between one driving sprocket 21 and one driven sprocket 22. When the driving sprocket 21 is driven for rotation, a slack run 23A of the chain 23 slackens slightly and a tension run 23B is pulled linearly due to rotational resistance of the driven sprocket 22 and the power transmission is performed.

The system shown in FIG. 4 has a chain 33 stretched between one driving sprocket 31 and two driven sprockets 32A, 32B creating one slack run 33A and two tension runs 33B, 33C of the chain 33. All of the runs respectively engage fixed guides 34A, 34B, 34C having shoe surfaces slightly bowed in convex circular arc shape and slidably contacting slidable the chain 33. Swinging of the chain 33 during running is prevented by the fixed guides.

The system shown in FIG. 5 uses one driving sprocket 41 and one driven sprocket 42 in similar manner to that in FIG. 3, but a tensioner 44 is arranged on the slack run 43A of the chain 43, while the tension run 43B is guided by a linear fixed guide 45. In the tensioner 44, a tensioner lever 44B pivotally supported by a fixed support shaft 44A has a shoe surface pushing against an outside surface of the slack run 43A of the chain 43 by biasing force of a torsional coil spring 44C, thereby providing tension to the chain 43.

Further the system shown in FIG. 6 has a chain 53 stretched between one driving sprocket 51 and two driven sprockets 52A, 52B in a manner similar to that in FIG. 4, and a shoe 54A of a tensioner 54 is pushed against a slack run 53A and slackening of the chain 53 is prevented. Also two tension runs 53A, 53C of the chain 53 are guided respectively by two fixed guides 55A, 55B having shoe surfaces slightly bowed in convex circular arc shape.

When the chain drive system for driving auxiliary machinery in the prior art as shown in FIGS. 3 to 6 is used in an engine with rotation variation being large, for example, a Diesel engine, since the rotation variation is large in a driving sprocket provided at a crankshaft, there is a problem that impact force caused by the rotation variation acts on the chain and excessive tension is applied in pulses to the chain at tension run which is guided by fixed guides.

SUMMARY OF THE INVENTION

In order to solve the above-mentioned problems in the prior art, an object of the present invention is to provide a chain tension relieving device where excessive tension applied to the chain in the tension run is prevented.

In order to attain the foregoing objects, a chain tension relieving device of the present invention has a movable shoe surface for engaging a tension run of a chain stretched between at least one driving sprocket and one or more driven sprockets from the outer side within a bowed surface of the chain.

When tension at the tension run of the chain is the prescribed value or less, the shoe surface is held to the advanced position where the tension run of the chain is bowed by the biasing force of the biasing means, and when the tension exceeds the prescribed value, the tension run of the chain is straightened against the biasing force of the biasing means and the shoe surface retreats from the advanced position.

When the driving sprocket is driven for rotation, the rotational force is transmitted to the driven sprocket through the transmission run of the chain and the driven sprocket is rotated. In this case, the tension acts on the tension run of the chain, and the reaction force is applied to a shoe surface of the chain tension relieving device in the direction making the shoe surface retreat or retract from the advanced position.

In the normal state, however, since the biasing force of the biasing means holding the shoe surface to the advanced position is larger than the reaction force, the shoe surface is not moved from the advanced position in similar manner to the shoe surface in the usual fixed guide, and it slidably contacts the outside surface of the chain and guides the chain to cause it to travel the slightly bowed path.

If the rotational speed of the driving sprocket is varied or the rotational resistance of the driven sprocket is varied, the tension of the chain in the tension run abruptly becomes large, and if the tension exceeds the prescribed value, the tension run of the chain makes the shoe surface retreat from the advanced position against the biasing means. As a result, the tension run of the chain is straightened and the excessive tension is relieved.

When the tension in the tension run is decreased, the shoe surface is moved and returned to the advanced position again by the biasing force of the biasing means and the shoe guides the traveling of the chain. Stop means limits the return movement and maintains the shoe at its advanced position.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENTS

Figure 1:
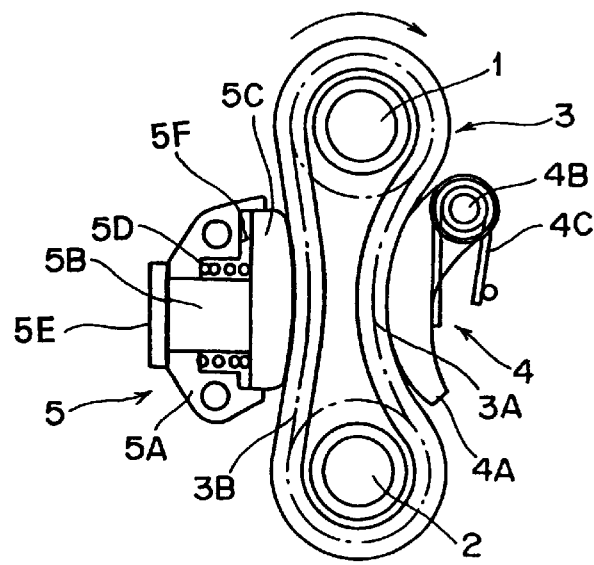
FIG. 1 is a construction diagram of a chain drive system showing a first embodiment of a chain tension relieving device of the invention.

In the first embodiment of a chain tension relieving device of the present invention shown in FIG. 1, a chain 3 is stretched between a driving sprocket 1 and a driven sprocket 2. When the driving sprocket 1 is driven for rotation, a slack run 3A of the chain 3 slackens slightly and a tension run 3B is pulled linearly due to rotational resistance of the driven sprocket 2 and the power transmission is performed. As shown, the slack and tension runs are disposed on opposite sides of the driving sprocket 1.

Along the slack run 3A of the chain 3, a tensioner 4 is mounted similarly to the prior art tensioners ordinarily used. In the tensioner 4, a tensioner lever 4A has a shoe surface with a convex circular arc shape slidably contacting the slack run 3A. The lever 4A is pivotally supported by a fixed support shaft 4B, and the shoe surface engages the outside surface of the slack run 3A under the biasing force of a torsional coil spring 4C and prevents the chain 3 from slackening or swinging.

On the other hand, a tension relieving device 5 of the present invention is arranged to engage the tension run 3B of the chain 3. In the tension relieving device 5 of this embodiment, a pressure plunger 5B is supported by a housing 5A mounted on a stationary support. The plunger 5B is movable forward and rearward in the orthogonal direction with respect to the traveling direction of the chain 3 in the tension run 3B.

The free end of the pressure plunger 5B has a shoe 5C forming a shoe surface in slightly convex circular arc shape slidably contacting the outside surface of the chain 3. The pressure plunger 5B is also biased in the direction pushing the shoe surface of the shoe 5C against the outer side of the chain 3 by a compression coil spring 5D interposed between the housing 5A and the plunger 5B. The outer end of the plunger 5B which projects from the outer side of the housing 5A has an enlarged head 5E whose underside normally seats against the outer surface of the housing. When the spring 5D is compressed, as described below, the head retracts from the surface. The retraction of the plunger is limited by engagement of the shoe 5C against an inner surface of the housing 5A, in the present instance the bottom of a recess 5F provided at the front of the housing which telescopically receives the shoe with a sliding fit.

The biasing force of the compression coil spring 5D is set larger than the force of the shoe surface of the tensioner lever 4A of the tensioner 4, pushing against the slack run 3A of the chain. In the state when the chain is stopped or operated with a normal load applied thereto, the biasing force of the compression coil spring 5D holds the plunger 5B at an advanced position, shown in FIG. 1, where the stopper part 5E formed at the rear end abuts against the rear surface of the housing 5A.

The tension run 3B of the chain 3 is slightly bent or bowed along the bowed shape of the shoe surface of the shoe 5C when the plunger 6B is at the advanced position. If the excessive tension acts on the tension run 3B of the chain 3, the reaction force applied from the tension run 3B to the shoe 6C becomes large and the plunger 5B is retracted rearwardly against the biasing force of the coil spring 5D.

When the tension run 3B of the chain 3 retracts the shoe 5C and the plunger 5B previously projected to the advanced position, the run 3B is straightened by the rearward movement of the plunger 5B and the excessive tension is relieved. When the excessive tension acting on the tension run 3B is decreased, the biasing force of the coil spring 5D becomes predominant and the plunger 5B is returned again to the advanced position. The stopper part 5E arrests the movement of the plunger 5B when the shoe 5C reaches the advanced position.

Figure 2:
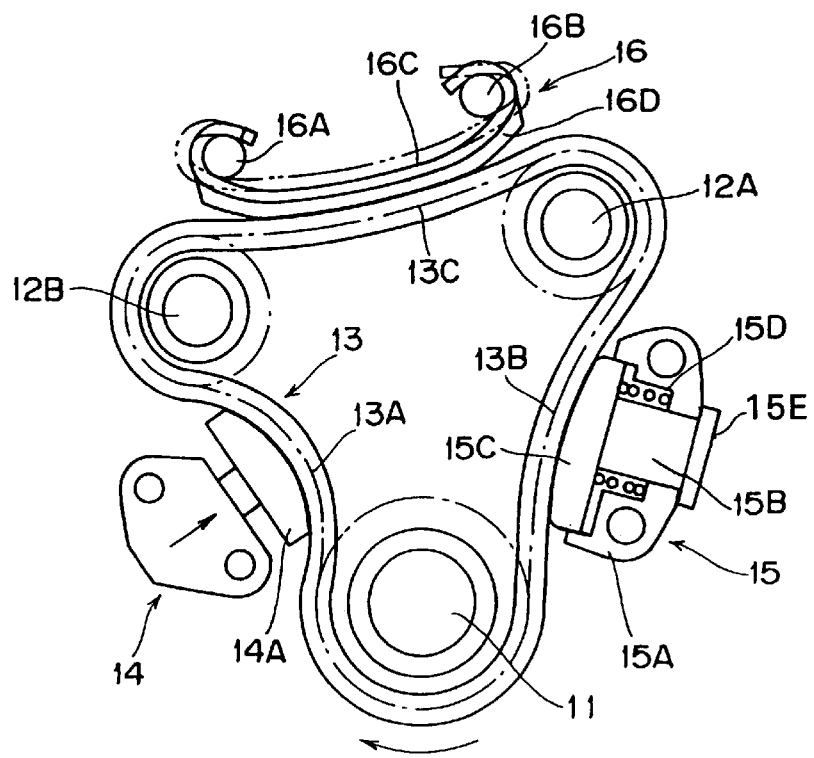
FIG. 2 is a construction diagram of a chain drive system showing a second embodiment of a chain tension relieving device of the invention.
Figure 3:
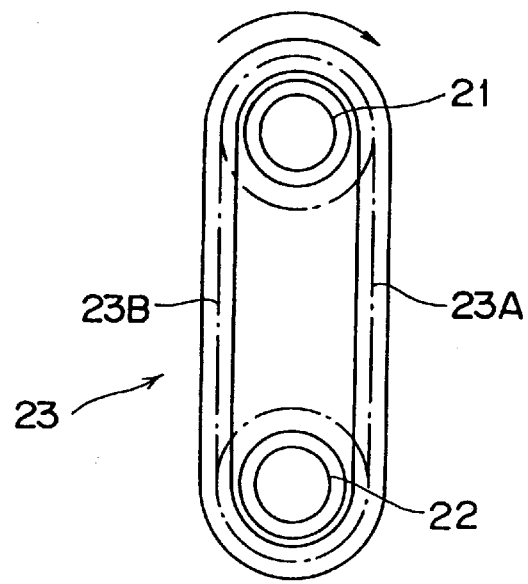
FIG. 3 is a diagram showing an example of a prior art chain drive system.
Figure 4:
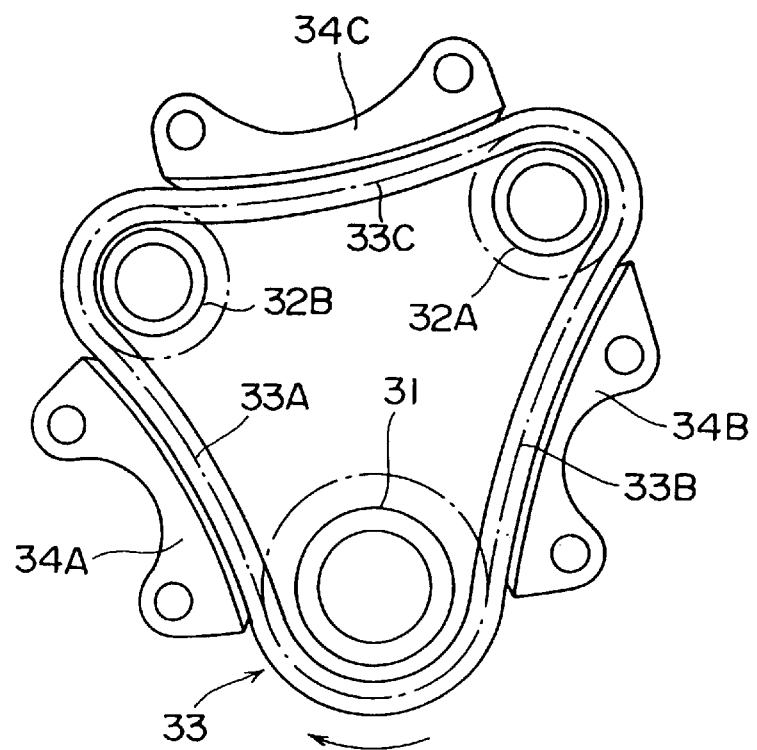
FIG. 4 is a diagram showing another example of a prior art chain drive system.
Figure 5:
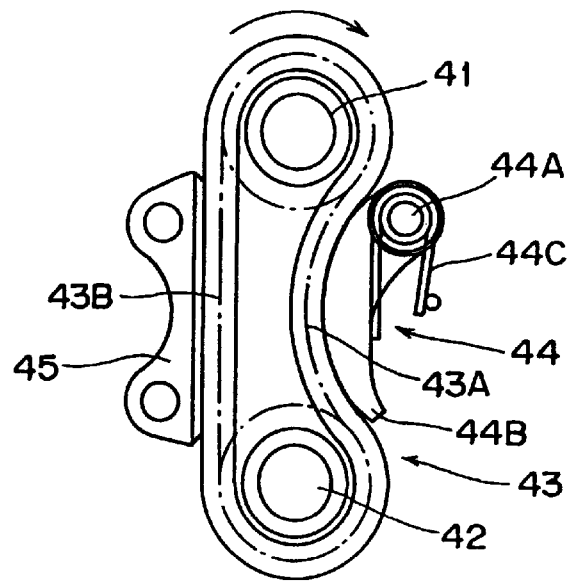
FIG. 5 is a diagram showing still another example of a prior art chain drive system.
Figure 6:
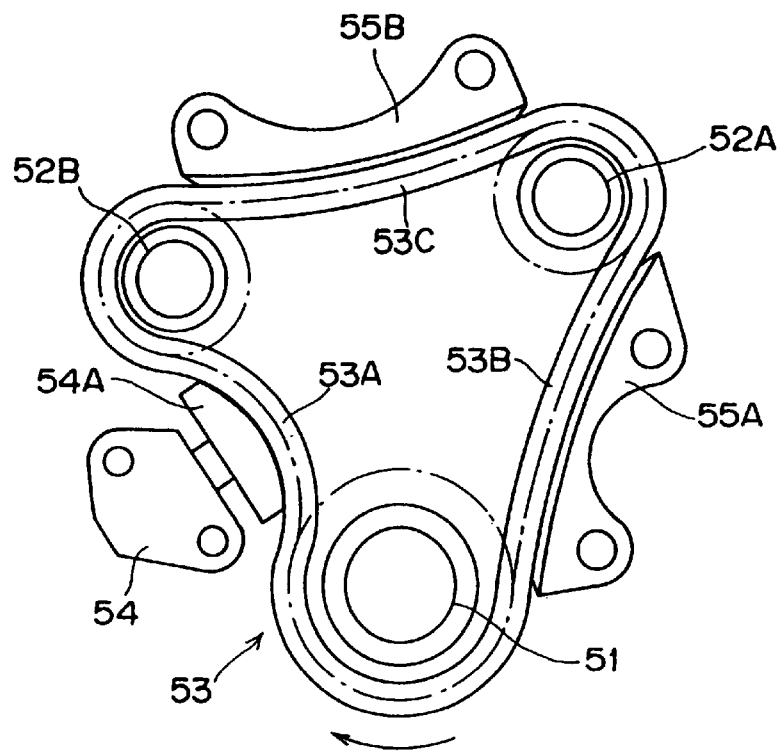
FIG. 6 is a diagram showing still another example of a prior art chain drive system.

A second embodiment of the invention is illustrated in FIG. 2, which is a construction diagram of a chain drive system embodying a chain tension relieving device of the present invention. In this embodiment, a chain 13 is stretched between a driving sprocket 11 and two driven sprockets 12A, 12B, and by driving the driving sprocket 11, the two driven sprockets 12A, 12B are interlocked and rotated in synchronization. When the driving sprocket 11 is driven for rotation, the chain 13 has a slack run 13A at the leading side of the driving sprocket, and a tension run 13B at the opposite trailing side of the driving sprocket. The chain 13 slackens slightly in the slack run, and is pulled linearly in the tension run due to rotational resistance of the driven sprocket 12A. The driven sprocket 12A which is adjacent the driving sprocket 11 at its trailing side has tension runs on both sides. The tension run 13B is created by the resistance offered by the driven sprocket 12A, and a tension run 13C is created by the resistance offered by the second driven sprocket 12B.

The chain 13 forms the slack run 13A between the driving sprocket 11 and the driven sprocket 12B, and the slack run 13A is normally engaged and biased by a shoe 14A of a tensioner 14 and the slackening is prevented.

The chain 13 forms the first tension run 13B between the driving sprocket 11 and the driven sprocket 12A, and at the outer side of the tension run 13B is arranged a tension relieving device 15 provided with a housing 15A with a recess 15F, a plunger 15B with a head 15E, a shoe 15C and a compression coil spring 15D in the same structural combination as that of the tension relieving device 5 shown in FIG. 1. When the chain 13 is stopped or operated with a normal load applied thereto, the shoe 15C is held to the advanced position by the biasing force of the compression coil spring 15D which seats the head 15E against the housing, and engages the shoe with the tension run 13B of the chain 13.

If the excessive tension exceeding the prescribed value acts on the tension run 13B of the chain 13, the shoe 15C is displaced rearwardly in similar manner to that of the tension relieving device 5 shown in FIG. 1 and the excessive tension is relieved.

In this embodiment, a second tension relieving device 16 is arranged along the outer side of the second tension run 13C. The tension relieving device 16 has a semielliptic leaf spring 16C supported between a pair of fixed support pins 16A, 16B spaced apart a prescribed distance along the second tension run 13C of the chain 13. A shoe 16D is applied to the leaf spring 16C on the surface confronting the outer side of the chain 13. The shoe 16D can be deformed in flexible deformation together with the leaf spring 16C slidably engaging the chain 13 from the outer side.

The leaf spring 16C of the tension relieving device 16 holds the shape shown by solid lines in FIG. 2, when tension acting on the tension run 13C of the chain 13 is of the prescribed value or less, that is, in the state when the chain 13 is stopped or operated with a normal load applied thereto. The chain 13 engages the shoe 16D and is bowed corresponding to the shape of the leaf spring 16C. If excessive tension (exceeding the prescribed value) acts on the tension run 13C, the leaf spring 16C is deformed in elastic deformation by the reaction force received from the outside of the chain 13 through the shoe 16D, and the shoe 16D is displaced rearward to the position shown by the broken lines in FIG. 2.

When the tension run 13C of the chain 13, normally bowed along the shoe 16D, is straightened, the excessive tension is relieved. When the tension is decreased to the prescribed value or less, the leaf spring 16C is displaced and restored by its elastic force, and the shoe 16D advances and guides the chain 13 again along the normal bowed path.

In addition, the biasing force of the compression coil spring 15D and the leaf spring 16C of the tension relieving device 15 and the tension relieving device 16 is set so that the tension given to the chain 13 by the shoe 15C and the shoe 16C respectively becomes larger than the tension given to the chain 13 by the shoe 14A of the tensioner 14.

The tension relieving device of the present invention is not limited to a chain drive system having structure where the shoe is installed on the end of a plunger moved forward and rearward with respect to a housing, or to a drive system having structure where the shoe is applied to a semielliptic leaf spring supported between a pair of support pins as shown in this embodiment, but, for example, in similar manner to the tensioner 4 in FIG. 1, a pivoted lever may be provided with the shoe surface abutting on the tension run of the chain so that the lever is biased by the spring against the outer side of the chain. In this case, being different from the usual tensioner 4, a stopper or the like must be provided so that the lever is not rocked beyond the advanced position where the lever can abut on the chain, and such structure is necessary so that the lever can be displaced rearward only when the tension acting on the tension run of the chain exceeds the prescribed amount.

Also in the embodiment as above described, although the tension relieving device is used in combination with the tensioner, the tension relieving device may be used in a chain drive system where no tensioner is used on the slack run of the chain.

Also when a plurality of driven sprockets are used and a plurality of tension runs exist in a chain, a tension relieving device may be arranged only at a trailing position where the chain enters the driving sprocket to which the most excessive tension is applied, or the tension relieving device may be used in combination with a chain guide of fixed type. Further in the embodiment shown in FIG. 2 as above described, although the two tension relieving devices 15 and 16 are different in structure, two having the same structure may be used.

As above described, according to a chain tension relieving device of the present invention, when tension of a chain exceeds a prescribed value, since a shoe contacting slidable with a outside surface of a chain at a tension run in the advanced position is moved rearward and guides the tension run of the chain to be straightened, excessive tension applied to the chain due to variation of rotation of a driving sprocket or variation of rotational resistance of a driven sprocket can be relieved. As a result, large driving force can be transmitted using a chain of small size, and a chain drive system of low noise in small size and light weight can be obtained.

While particular embodiments of the invention have been herein illustrated and described, it is not intended to limit the invention to such disclosures, but changes and modifications may be made therein and thereto within the scope of the following claims.

What is claimed is:

1. For a chain drive assembly having at least one driving side sprocket and at least one driven side sprocket, and a chain stretched between the sprockets with a tension run on one side of the driven sprocket and a slack run on the opposite side of the driven sprocket, a chain tension releasing device having a shoe surface and a biasing means positioned to produce a biasing force pushing said shoe surface against the tension run of the chain from an outer side forming a bowed surface of the chain in the tension run, wherein said biasing means comprises a fixed housing mounted adjacent the tension run of the chain, a plunger mounted in said housing for orthogonal movement relative to the direction of travel of the chain in the tension run, said plunger having an inner surface at its outer end, said housing having an outer surface, said outer surface positioned to engage the inner surface of said plunger to stop inward displacement of said plunger at a given advanced position of said plunger, said shoe surface being mounted at the inner end of said plunger beyond the inner surface of said plunger, and a compression spring seated between said plunger and said housing urging said plunger inwardly to the advanced position when tension of the chain at the tension side is a prescribed value or less, the shoe surface being held to the advanced position where the tension side of the chain is bowed by the biasing force of said biasing means, said inner surface of the plunger engaging said outer surface of the housing to prevent further inward displacement of the plunger, and when the chain tension exceeds the prescribed value, the tension side of the chain being straightened against the biasing force of said compression spring so that the shoe surface retreats from the advanced position.

2. A chain tension releasing device according to claim 1 comprising an enlarged head at the outer end of said plunger providing said inner surface to engage the housing at the advanced position, and to disengage said housing outer surface when said shoe surface is displaced outwardly by tension in the tension run exceeding the prescribed value.

3. A chain tension releasing device according to claim 2 comprising a recess in said housing telescopically receiving said shoe when said surface is retracted from said advance position, said plunger head having an outer surface opposite to said inner surface, said recess having a bottom adapted to engage the plunger head outer surface to limit the outward displacement of said shoe surface.

4. A chain drive system having at least one driving sprocket and one or more driven sprockets adjacent to said at least one driving sprocket, and a chain looped around said sprockets, said chain having at least one tension run and at least one slack run, said runs being on opposite sides of said at least one driving sprocket, said chain runs being flexible, and a chain tension releasing device comprising a fixed housing adapted to be mounted alongside said tension run, and a plunger mounted in said housing and displaceable orthagonally to the direction of travel of said run, said housing having a surface engaging said plunger and preventing inward displacement of said plunger beyond a given advanced position, a shoe on an inner end of said plunger having a surface movable to said advanced position and positioned to engage an outer side of said tension run and flex said run to a bowed condition between said at least one driving sprocket and an adjacent driven sprocket, and bias means comprising a compression spring mounted between said shoe and said housing and having a bias force urging said shoe surface inwardly to said advanced position when the tension in said tension run is below a prescribed value, said advanced position being a normal operating condition of said system, said tension chain run operable to retract said shoe surface from said advanced position when said tension in said tension run exceeds the prescribed value, the tension run of the chain being straightened against the bias force of said compression spring.

5. A chain drive system according to claim 4 wherein said plunger has a head positioned to engage said housing and determine the maximum inward displacement of said shoe when in said advanced position.

6. A chain drive system according to claim 4, including a second tensioner engaging said slack run of the chain to limit swinging of the chain as a result of variations in tension in said slack run.

7. A chain drive system according to claim 6 wherein said second tensioner comprises a tensioner lever mounted on a fixed pivot alongside said slack run, and a spring element rocking said lever toward the inner side of said chain run.

8. A chain drive system device according to claim 6 wherein said second tensioner comprises a fixed housing alongside said slack run, and a plunger mounted in said housing, a biasing means urging said plunger toward the inner side of said chain run, and a shoe mounted on said plunger for engaging said slack run.

* * * * *